Nov. 9, 1965                A. C. ARBOGAST             3,216,092
METHOD FOR MAKING WROUGHT Y-FITTINGS
FROM A TUBULAR WORK PIECE
Filed Oct. 27, 1960                                2 Sheets-Sheet 1
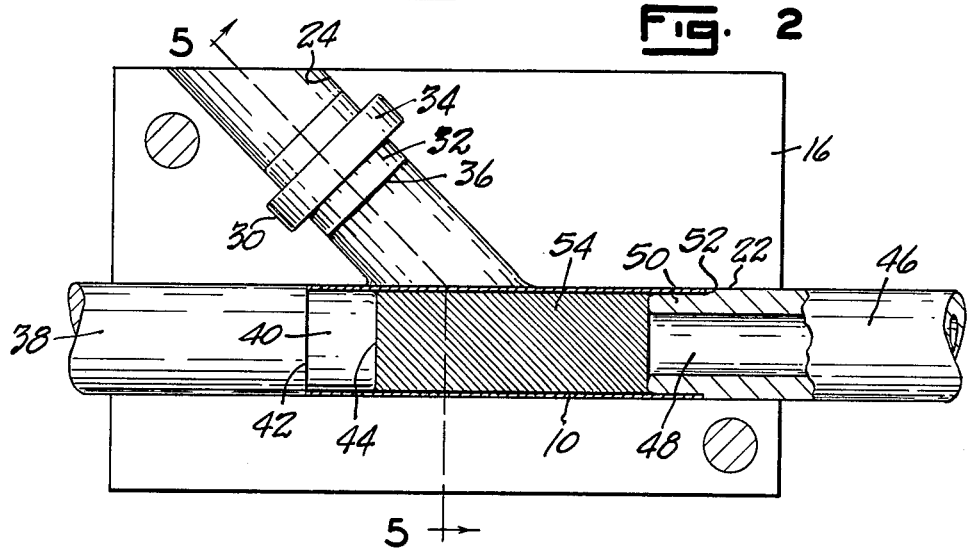
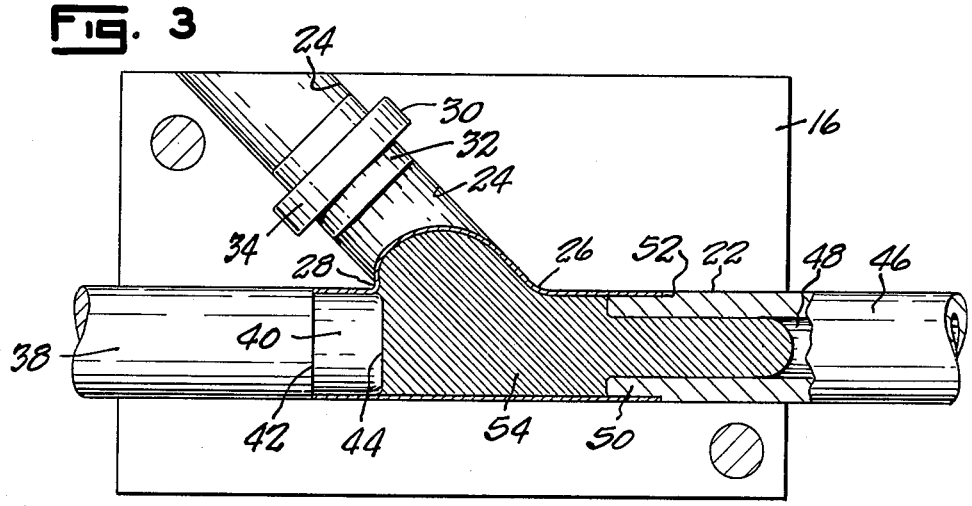
*INVENTOR.*
ALFRED C. ARBOGAST
BY
*Eugene C. Knoblock*
ATTORNEY Nov. 9, 1965     A. C. ARBOGAST     3,216,092
METHOD FOR MAKING WROUGHT Y-FITTINGS
FROM A TUBULAR WORK PIECE Filed Oct. 27, 1960     2 Sheets-Sheet 2

*INVENTOR.*
ALFRED C. ARBOGAST
BY
*Eugene C. Knoblock*
ATTORNEY

United States Patent Office

3,216,092
Patented Nov. 9, 1965

3,216,092
METHOD FOR MAKING WROUGHT Y-FITTINGS
FROM A TUBULAR WORK PIECE
Alfred C. Arbogast, 1255 Oak St., Elkhart, Ind.
Filed Oct. 27, 1960, Ser. No. 65,430
4 Claims. (Cl. 29—157)

This invention relates to a method for making wrought Y-fittings from a tubular work piece.

This invention is an improvement upon the subject matter of the Seeber et al. Patent No. 2,111,695, dated March 22, 1938, and of my prior Patent No. 2,557,403, dated June 19, 1951.

The primary object of this invention is to provide novel and simple means and method for producing a wrought Y-fitting accurately, rapidly and inexpensively by cold working a tubular work piece to produce therein a laterally projecting tubular branch of preselected dimensions and extending at a preselected angle to the work piece.

A further object is to provide means for producing a Y-fitting from tubular stock containing a deformable filler by means of a die having a cavity of the configuration of the desired Y-fitting, a stationary work abutment within the cavity and a work-advancing plunger shifting in the direction of said stationary abutment.

A further object is to provide means for producing a Y-fitting from tubular stock containing a deformable filler, wherein a die has a die cavity of the shape of the desired fitting and including a portion snugly receiving said tubular work piece and a branch portion extending at an acute angle to said work piece, said die mounting a work abutment having a portion within the tube engaging the filler and positioned with a portion of its inner end aligned with a portion of said acute angle die cavity to laterally deflect filler material in a part of said tube into said acute angled cavity portion when the work piece and filler are pushed against said abutment from the end opposite that engaged by said abutment.

A further object is to provide a method of forming a wrought Y-fitting from a preformed tube by partially filling a tubular work piece with a deformable filler and pressing endwise upon said work piece and filler within an enclosure having an internal configuration corresponding to the desired fitting while said work and filler abut against a stationary stop located adjacent a branch of said enclosure cavity, whereby to reform said tube and said filler in said cavity to desired configuration while maintaining a substantially uniform wall thickness throughout said fitting.

Other objects will be apparent from the following specification.

In the drawings:

FIG. 1 is a view of a tubular work piece;

FIG. 2 is a view of a portion of the apparatus with one die member removed and with the work piece and parts of the apparatus shown in section and illustrating the start of the forming operation.

FIG. 3 is a view similar to FIG. 2 but illustrating an intermediate condition of the apparatus and the work piece during the tube-forming operation;

Figure 6:
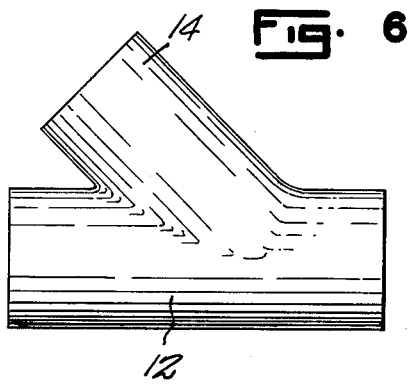
FIG. 6 is a slightly enlarged view of the Y-fitting produced from the work piece shown in FIG. 1.

My improved method is utilized to produce from a metal tube 10, as illustrated in FIG. 1, a Y-fitting as illustrated in FIG. 6, having an open ended tubular body portion 12 and a tubular branch portion 14 extending at a selected acute angle to the body portion 12. The metal tube 10 is preferably formed of wrought metal having characteristics or properties suitable for drawing thereof, such for example as copper tubing, aluminum tubing, Monel tubing, zinc tubing or magnesium tubing. Tube 10 is preferably seamless drawn tubing of selected diameter, preferably corresponding substantially to the diameter and wall thickness of the main body portion 12 of the fitting to be formed therefrom.

Figure 5:
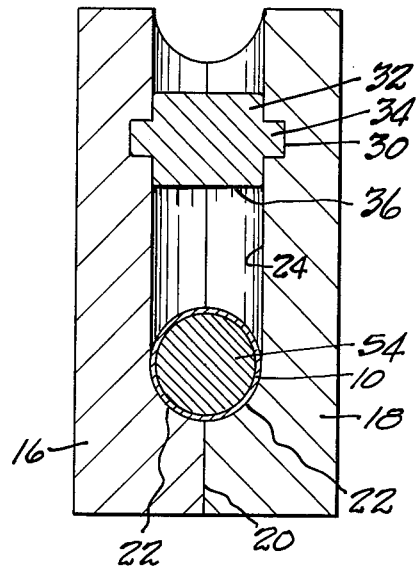
FIG. 5 is a sectional view taken on line 5—5 of FIG. 2.

The apparatus utilized to form the fitting 12, 14 comprises a pair of dies 16 and 18 which are adapted to abut at a parting plane 20. The dies are mounted in a suitable press or machine capable of moving them between a closed position in which the parting faces abut, as illustrated in FIG. 5, and an open position in which the dies are separated by any spacing desired.

The parting faces of the dies 16 and 18 have die cavities or recesses formed therein which preferably are complementary and which cooperate when the die members are closed to provide a die cavity of a configuration corresponding to the shape of the fitting to be produced. In the preferred embodiment each die member has a groove or recess 22 extending from end to end thereof and preferably of semi-cylindrical shape, with the axis thereof lying in the parting plane 20. A branch recess or groove 24 is preferably formed in each die member extending from the die cavity 22 to the lateral edge thereof at a selected acute angle. Branch cavity portions 24 are complementary and cooperate when the die members are closed to form a branch die cavity of the desired configuration and contour. The cavities 22 and 24 preferably merge at faired portions having selected curvatures, such as portion 26 at the obtuse angle portion of the junction of the recesses 22 and 24 and the curved pointed small radius portion 28 at the acute angle junction between the recess or cavity portions 22, 24. The recesses 24 may be enlarged at 30 to define annular grooves.

The forming die is completed by abutment or stop member 32 having an annular enlarged rib 34 intermediate its length seated in the groove 30. The inner face 36 of the abutment will preferably be flat or plain, extending perpendicular to the axis of the cavity 24 and positioned spaced from the cavity 22 a distance substantially equal to or slightly greater than the length of the desired branch tube portion 14 to be formed.

Figure 4:
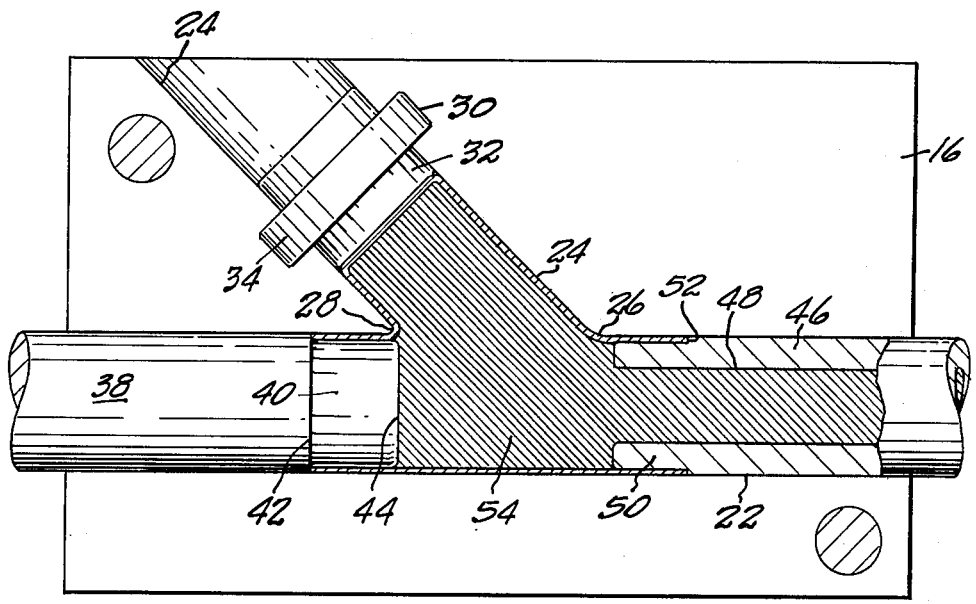
FIG. 4 is a slightly enlarged view similar to FIG. 2 but illustrating the parts at the end of the forming operation.

A plunger or abutment member 38 fits snugly in the bore 22 at the end thereof alongside the branch cavity 24, i.e., at the left as seen in FIGS. 2, 3 and 4. The plunger 38 has a reduced cross-section end portion 40 adapted to fit snugly within the leading end portion of the work piece 10. Suitable means (not shown) are provided for actuating the plunger 38 between a position retracted from the die and a predetermined operative position in which the circumferential or annular shoulder 42 thereof is located in predetermined spaced relation to the acute angled part 28 between the main cavity and the branch cavity. The length of the reduced portion 40 of the plunger 38 is such as to locate its transverse end surface 44 slightly inwardly of and immediately adjacent to the acute angled die cavity portion 28 at said predetermined operative position.

A second plunger 46 fits snugly within the opposite end of the die cavity 22 and is provided with an axial recess 48 open at its leading end. The end portion 50 of plunger 46 is slightly reduced to fit snugly within the end of the work tube 10. Annular circumferential shoulder 52 between the reduced leading end portion 50 and the body of the plunger 46 provides an abutment engaging the end of the work tube. Plunger 46 and plunger 38 may be actuated, positioned and controlled by any suitable means. Both plungers are preferably shiftable endwise, with a predetermined limit being placed upon the inward stroke of the plunger 38, as mentioned above, and with a greater stroke of the plunger 46. Press means, hydraulic power members or any other suitable plunger actuator may be employed to shift the plungers.

The tubular work piece 10 is filled for the major portion of the length thereof by suitable plastic filler material, such as the filler material described in the Seeber Patent No. 2,111,695, dated March 22, 1938. Preferably the amount of filler material used will be such as to leave empty the opposite end portions of tubular member 10 so that it may receive the leading end portions 40 and 50 of the plungers 38 and 46, respectively.

In the practice of the method, the work tube 10 with the filler 54 of deformable plastic material is inserted in die cavity 22 of one of the dies while the dies are open, and the stop plug 32 is properly positioned in the branch cavity with its rib 34 seating in the groove 30 of the dies. Thereupon the dies 16 and 18 are closed and held closed with their parting faces 20 in contact. Tubular work piece 10 is located in the die cavity 22 substantially as illustrated in FIG. 2, with its opposite end portions projecting beyond the branch passage or cavity 24 of the die.

The plungers 38 and 46 are then advanced into the opposite ends of the die cavity 22 with the plunger 38 being advanced to a predetermined operative position shown in each of FIGS. 2, 3 and 4, and then being held stationary against endwise movement in either direction and against the thrust exerted by the plunger 46. There is no limit upon the stroke of the plunger 46 and its leading end 50 enters the tubular work piece 10 to engage the filler 54 preferably slightly in advance of the contact of the shoulder 52 of the plunger with the end of the work tube 10. By this arrangement, the plastic filler is compacted or compressed in the event it contains any voids and any excess of plastic material may enter the passage 48 in the plunger 46. While this passage 48 is shown as being of uniform cross-section, it may be tapered slightly so that its cross-sectional dimension reduces progressively from the mouth at the end of the plunger portion 50 toward the opposite end of the plunger. As movement of the plunger 46 into the die cavity continues, the shoulder 52 of plunger 46 abuts the end of the work piece 10 whose opposite end is then engaged by the shoulder 42 of the plunger 38.

As inward movement of the plunger 46 progresses, the filler material 54 is reshaped under pressure and moves laterally relative to the tube into the branch die cavity 24, as illustrated in FIG. 3, thereby bulging, deflecting or deforming the adjacent portion of the tube laterally of the axis of the tube and into said branch die cavity 24. The metal required for this bulging or reshaping of the tube is provided by said flow of the metal of the preformed tubular work piece 10 as a result of end pressure exerted thereagainst. Simultaneously with this lateral bulging of the filler and deforming of the tube, some of the filler may progressively enter the plunger cavity 48. The application of pressure by advance of the plunger 46 continues until the filler material and the tubular work piece have been deformed to completely fill the portion of the die cavity branch 24 inwardly of the plug 32, with the end of the deformed part of the tube contacting the transverse inner face 36 of the plug 32, as illustrated in FIG. 4.

The location of the inner end face 44 of the plunger 38 with reference to the acute angled portion 28 of the die during the forming operation is of critical importance. The plunger face 44 serves to deflect the plastic filler material 54 laterally into the die cavity 24 as the filler is pressed thereagainst by the plunger 46. This lateral deflection occurs inwardly relative to the acute-angled die part 28 so as to prevent the exertion of pressure upon the tubular work piece by the filler against die part 28 in a manner and in a direction which would tend to pierce the work piece as it is reshaped around and in conformity with the die part 28. Thus any flow of filler material at the region of the point 28 is directed transversely of the axis of the work piece and of the die cavity 22 by the transverse plunger face 44.

As seen in FIG. 3, the initial action of the laterally bulging filler upon the part of the work tube adjacent the die portion 28 serves to progressively bend the bulged part of the work piece around the small radius acute angled die part 28. Then the filler material expands into the die cavity to progressively fill the branch 24, and the metal of the work tube is progressively caused to cold flow into the branch cavity 24 while the overall length of the work piece progressively reduces. The cold flow of the metal of the work tube as it is shortened by end pressure is sufficient to supply metal for the purpose of forming the branch 14 in the work piece and of maintaining the wall thickness of the fitting substantially uniform. This is accomplished by the automatic regulation of the internal pressure exerted upon the work piece by the filler which is made possible by end flow of the filler material into the recess 48 of plunger 46. This pressure regulation is governed by the cross-sectional area of the plunger recess 48 and the rate of taper of the recess 48.

After complete filling of the portion of the branch die cavity 24 inwardly of the plug 32 by the work as seen in FIG. 4, both plungers 38 and 46 are withdrawn from contact with the work piece and the filler thereof. Thereupon the dies 16 and 18 are opened and the work piece is withdrawn. The work piece is then heated to a temperature sufficient to melt and permit flow therefrom of all of the filler material 54 contained therein without melting or adversely affecting the work piece. Thereupon the end of the branch of the work piece is cut to provide a branch part 14 of desired length and open at its free or outer end. Any further processing desired can then be performed, such as the radial expansion of all or selected ends of the tubular portions of the fitting to provide bells to receive tube portions to be connected thereto as by means of soldering or brazing.

I prefer to employ a plug 32 which is imperforate but this is not critical and a small passage or recess may be formed therein to accommodate flow of the plastic filler. In cases where such passage is provided in the plug 32 the size of the passage or recess 48 in the plunger 46 may be reduced somewhat as compared to the size thereof required in cases where the plug 32 is imperforate.

While the tubular work piece, the completed fitting and the die cavities have been shown and described here as cylindrical or part cylindrical, it will be understood that this is illustrative only and is not intended to be limiting, inasmuch as these parts may be non-circular in cross-sectional shape if desired.

It will be understood that lubricant material may be employed in connection with the deformable filler 54 if desired, as explained in my prior Patent No. 2,557,403.

While the preferred embodiment of the invention has been described, it will be understood that changes may be made within the scope of the appended claims without departing from the spirit of the invention.

I claim:

1. The method of forming a wrought metal Y-fitting consisting of the steps of mounting within a die cavity having a main open ended portion and an obliquely extending branch portion with a closed end and of the shape of the fitting desired a metal tube of substantially the cross-sectional dimension and wall thickness desired and containing a quantity of a deformable filler, inserting in fixed position in the main portion of said cavity a member having a circumferential shoulder abutting an end of said tube and having a reduced filler deflecting portion fitting snugly in said tube and projecting slightly past and having an inner face located inwardly of and immediately adjacent to the acute angled portion of the die at the junction of said main and branch cavity portions, and advancing in the opposite end of said main cavity portion and toward said fixed member a plunger having a circumferential tube-engaging shoulder and a reduced filler-engaging portion fitting snugly in said tube whereby to press upon the ends of said tube and filler and expand laterally into said branch cavity portion a part of said filler and deflect and reshape a part of said tube adjacent said acute angled die portion laterally of the axis of the tube and into conformity with the branch die cavity without perforating the same at said acute angled die part.

2. The method of forming a wrought metal Y-fitting consisting of the steps of inserting a deformable filler in a metal tube of substantially the cross-sectional dimension and wall thickness of the fitting desired, confining said filled tube in a die cavity having a main portion and a branch portion and being of the shape of the desired fitting in end abutment with a fixedly positioned stop having a tube-engaging circumferential shoulder and a reduced portion fitting snugly in said tube and terminating at an end face located inwardly of and immediately adjacent said branch die cavity portion, and advancing in said die cavity toward said fixed stop a plunger having a tube-engaging circumferential shoulder and a reduced portion fitting snugly in said tube whereby said tube and filler are simultaneously pressed endwise against said stop and deformed whereby portions thereof are deflected laterally of the axis of the work piece adjacent said acute angled die portion and into said branch die cavity to fill the same.

3. The method of forming a wrought metal Y-fitting consisting of the steps of introducing a deformable filler in the central portion of a metal tube of substantially the cross-sectional dimension and wall thickness of the desired fitting, confining said tube in a die cavity of the shape of the desired fitting with an end portion of each of said tube and said filler in engagement with a stationary stop, said cavity having a main portion and an oblique portion closed at its outer end, the filler-engaging part of said stop terminating at an end face located immediately adjacent to and inwardly from an acute angle part of said die at the junction of said branch and main cavity portions, and pressing endwise on said tube and filler toward said stop to reshape said filler and deflect said filler and a portion of said tube intermediate its length laterally of the axis of the tube adjacent said acute angled die portion into conformity with said branch cavity without severing said tube at said acute-angled die part.

4. The method of forming a wrought metal Y-fitting consisting of the steps of introducing a deformable filler in the central portion of a metal tube of substantially the cross-sectional dimension and wall thickness of the desired fitting, confining said tube in a die cavity of the shape of the desired fitting with an end portion of each of said tube and said filler in engagement with a stationary stop, said cavity having a main portion and an oblique portion closed at its outer end, the filler-engaging part of said stop terminating at an end face located immediately adjacent to and inwardly from the acute angle part of said die at the junction of said branch and main cavity portions, and advancing in said die cavity to push endwise against said tube and said filler a plunger having an end portion fitting snugly in said tube and having a recess open at its end, whereby to force some of said filler laterally of the axis of the tube adjacent said acute angled die portion and into said die cavity oblique portion while shortening said tube by end pressure to deflect a part of said tube to conform to said oblique cavity portion and simultaneously extrude some of said filler into said plunger recess.

References Cited by the Examiner
UNITED STATES PATENTS

| | | | |
|---|---|---|---|
| 2,027,285 | 1/36 | Parker | 29—157 |
| 2,111,695 | 3/38 | Seeber | 29—157 |
| 2,200,664 | 5/40 | Arbogast | 29—157 |
| 2,203,868 | 6/40 | Gray | 113—44 |
| 2,206,741 | 7/40 | Cornell | 29—157 |
| 2,616,164 | 11/52 | Tiedemann | 113—44 |
| 2,858,787 | 11/58 | Hill | 113—44 |

FOREIGN PATENTS

| | | |
|---|---|---|
| 1,154,610 | 11/57 | France. |
| 448,274 | 6/36 | Great Britain. |

WHITMORE A. WILTZ, *Primary Examiner.*

HYLAND BIZOT, JOHN F. CAMPBELL, *Examiners.*